(12) United States Patent
Wickeraad et al.

(10) Patent No.: US 6,490,654 B2
(45) Date of Patent: *Dec. 3, 2002

(54) METHOD AND APPARATUS FOR REPLACING CACHE LINES IN A CACHE MEMORY

(75) Inventors: John A. Wickeraad, Loomis, CA (US); Stephen B. Lyle, Rocklin, CA (US); Brendan A. Voge, Granite Bay, CA (US)

(73) Assignee: Hewlett-Packard Company, Palo Alto, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/127,491

(22) Filed: Jul. 31, 1998

(65) Prior Publication Data

US 2001/0001873 A1 May 24, 2001

(51) Int. Cl.[7] .................................................. G06F 12/12
(52) U.S. Cl. ........................ 711/133; 711/134; 711/136; 711/141
(58) Field of Search ............................... 711/160, 133, 711/155, 136, 159, 213, 134, 135, 137, 141, 142, 143, 144, 145, 146; 712/203

(56) References Cited

U.S. PATENT DOCUMENTS

| | | | | |
|---|---|---|---|---|
| 5,732,242 A | * | 3/1998 | Mowry | 711/136 |
| 5,737,565 A | * | 4/1998 | Mayfield | 711/213 |
| 5,751,993 A | * | 5/1998 | Ofek et al. | 711/136 |
| 5,774,685 A | * | 6/1998 | Dubey | 712/205 |
| 5,809,280 A | * | 9/1998 | Chard et al. | 711/160 |
| 5,909,695 A | * | 6/1999 | Wong et al. | 711/133 |
| 6,032,233 A | * | 2/2000 | Loffler et al. | 711/155 |
| 6,047,358 A | * | 4/2000 | Jacobs | 711/133 |

* cited by examiner

Primary Examiner—Matthew Kim
Assistant Examiner—B. R. Peugh
(74) Attorney, Agent, or Firm—David A. Plettner

(57) ABSTRACT

A cache memory replacement algorithm replaces cache lines based on the likelihood that cache lines will not be needed soon. A cache memory in accordance with the present invention includes a plurality of cache lines that are accessed associatively, with a count entry associated with each cache line storing a count value that defines a replacement class. The count entry is typically loaded with a count value when the cache line is accessed, with the count value indicating the likelihood that the contents of cache lines will be needed soon. In other words, data which is likely to be needed soon is assigned a higher replacement class, while data that is more speculative and less likely to be needed soon is assigned a lower replacement class. When the cache memory becomes full, the replacement algorithm selects for replacement those cache lines having the lowest replacement class. Accordingly, the cache lines selected for replacement contain the most speculative data in the cache that is least likely to be needed soon.

10 Claims, 2 Drawing Sheets

METHOD AND APPARATUS FOR REPLACING CACHE LINES IN A CACHE MEMORY

FIELD OF THE INVENTION

The present invention relates to cache memories in computer systems. More specifically, the present invention relates to a cache memory replacement algorithm that determines which cache lines in a cache memory are eligible to be replaced when an associative set of the cache memory is full.

DESCRIPTION OF THE RELATED ART

In the art of computing, cache memories are used to store a portion of the memory contents of a main memory that are likely to be used soon. As used herein, the term "cache" will also be used to refer to a cache memory. Caches are typically smaller and faster than main memory, and are used to mask latencies involved in retrieving memory operands from main memory. In modern computer systems, cache access times are typically about 500% to 3000% faster than main memory access times.

An entry of a cache is known in the art as a cache line, and typically a cache line will store a small contiguous range of main memory contents, such as 32 or 64 bytes. While cache memories are not limited to CPUs, a primary application for cache memories is to store memory operands required by one or more central processing units (CPUs). Note that it is known in the art to provide multiple levels of caches. For example, a CPU may be provided with a level one (L1) cache on the same integrated circuit as the CPU, and a larger and slower level two (L2) cache in the same module as the CPU. In the discussion that follows, it will be assumed that memory operands are loaded into a cache from main memory. However, those skilled in the art will recognize that such operands may also be loaded from a higher level cache if the operands are present in the higher level cache.

Since cache memories are typically smaller than the main memories to which they are coupled, a strategy is required to determine which contents of the main memory are to be stored in the cache. This strategy usually comprises two components: a cache organization and a cache replacement algorithm. The replacement algorithm determines which cache line should be replaced when the cache (or an associative set of the cache, as described below) becomes full.

One of the simplest cache organizations is the direct-mapped cache organization. In a direct-mapped cache, a portion of the main memory address is used as an index, and the remainder of the main memory address (not including any bits of the main memory address that represent bytes within a cache line) is used as a tag. The number of bits used for the index corresponds to the size of the cache. For example, a direct-mapped cache having 64 cache lines will have a index comprising six bits. When a read operation occurs and the memory operand is not in the cache (i.e., the tag does not match), the memory operand is fetched from main memory and stored in the cache line corresponding to the index, and the tag is stored in a tag field associated with the cache line. Assuming the memory operand is still in the cache (i.e., the tags match) the next time a read operation occurs the memory operand will be retrieved from the cache. Incidently, the term "cache hit" is used in the art to refer to a memory access wherein the required memory operand is already in the cache, and the term "cache miss" is used in the art to refer to a memory access wherein the memory operand is not in the cache and must be loaded from main memory or a higher level cache.

The replacement algorithm used with a direct-mapped cache is trivial. For any given byte in the main memory, there is only one cache line in which the byte can be stored. Therefore, if the cache line is in use, the old contents of the cache line are simply overwritten with the new contents. The act of altering the contents of a cache line after the cache line has been loaded from memory is known in the art as "dirtying" the cache line. "Dirty" cache lines must be written back to main memory before the new contents can be stored in the cache line. If the old contents in the cache line are identical to the contents in main memory, the old contents may be overwritten without having to write back to main memory.

One problem associated with direct-mapped cache memories is that two often-used memory operands may need to be stored in the same cache line. Since the two memory operands will contend for the same cache line, much of the advantage provided by the cache will be lost as the two operands continuously replace each other.

Another cache organization is the associative cache organization. A fully-associative cache simply has a pool of cache lines, and a memory operand can be stored in any cache line. When a memory operand is stored in an associative cache, the address of the memory operand (excluding any bits representing the bytes stored within the cache line) is stored in a tag field associated with the cache line. Whenever a memory operation occurs, the tag fields associated with each cache line are searched to see if the memory operand is stored in the cache. One disadvantage of an associative cache is that all tag fields of all cache lines must be searched, and as the number of cache lines is increased, the time required to search all tag fields (and/or the complexity of the searching logic) also increases.

The set-associative cache organization is a hybrid of the direct-mapped and associative memory organizations. In a set-associative cache, an index portion of the memory address identifies a subset of the cache lines. As above, a tag field is associated with each cache line. However, only the tags of the subset of cache lines identified by the index need be associatively searched. For example, consider a cache having 256 entries organized into 64 subsets, with each subset having four cache lines. Such a memory will have an index comprising six bits. When a memory operation occurs, the index identifies one of the 64 subsets, and the tag fields associated with the four cache lines in the subset are searched to see if the memory operand is in the cache. The set-associative cache organization allows a cache to have many cache lines, while limiting the number of tag fields that must be searched. In addition, memory operands need not contend for the same cache line, as in a direct-mapped cache.

As used herein, the term "associative set" will be used to refer to all cache lines of a purely associative cache, and to a set of a set-associative cache. When an associative set is full and a new cache line must be stored in the associative set, an algorithm is required to determine which cache line can be replaced. Several such algorithms are known in the art. A "random" algorithm simply picks a cache line at random. While the implementation is simple, the random algorithm provides relatively poor results since there is no correspondence between the cache line contents selected for replacement and the probability that the selected contents will be needed soon.

A better algorithm is the first-in first-out (FIFO) algorithm. This algorithm treats the associative set as a circular queue wherein the cache line contents that have been in the associative set the longest are replaced. This algorithm provides better results than the random algorithm because the algorithm observes cache misses to create correspondence between the cache line selected for replacement and the probability that the cache line will be needed soon. The algorithm works well when all memory contents needed by the CPU are loaded into the cache and other cache misses do not cause the needed memory contents to be replaced. However, the algorithm does not recognize that if a cache line is repeatedly accessed by the CPU, it should not be replaced. The only factor considered is the length of time that the memory contents have been in the cache. The algorithm is slightly more complex to implement than the random algorithm. Typically a single counter associated with an associative set and is used to provide an index indicating which cache line is next in line for replacement, and the counter is incremented every time there is a cache miss and an operand is loaded from main memory.

One of the best prior art cache replacement algorithms is the least recently used (LRU) algorithm. As the name implies, this algorithm discards the cache line contents that were used least recently. This algorithm tends to be very effective because the algorithm observes both cache hits and cache misses to create correspondence between the cache line selected for replacement and the probability that the cache line will be needed soon. However, the algorithm is relatively complex to implement because a counter value is typically associated with each cache line.

To illustrate how the LRU algorithm functions, consider a full associative set having eight cache lines. A three-bit LRU counter value is associated with each of the cache lines and each counter value is unique, with a counter value of "000" representing the least recently used cache line and a counter value of "111" representing the most recently used cache line. When a cache miss occurs, the memory operand is loaded into the cache line having a counter value of "000", the counter value of this cache line is set to "111", and all the other counter values are decremented. When a cache hit occurs, the counter values of all cache lines having a counter value greater than the counter value of the cache line that contains the required memory operand are decremented, and the counter value of the cache line that contains the required operand is set to "111". Clearly, the logic to implement the LRU algorithm is more complex than the logic required to implement the FIFO algorithm. Other algorithms are known in the art which approximate the LRU algorithm, but are less complex to implement. The LRU algorithm (and to a lesser extent the FIFO algorithm) work well with CPU access patterns because CPUs tend to use the same data and code several times due to loops and data manipulations.

As the art of computer design continues to advance, it is becoming apparent that cache memories may also be beneficially used to increase the performance of input/output (I/O) subsystems. In the prior art, it was typical to simply provide a few buffers between an I/O subsystem and a main memory, with the buffers holding no more than a few memory words. However, one problem associated with using caches in I/O subsystems is that the algorithms that work so well with CPU memory access patterns tend to work less well for I/O subsystem memory access patterns because cache lines may be replaced before they are used.

I/O memory access tend to be much more linear in nature, and reuse of data stored in the cache is much less likely. To hide the latency of main memory, I/O subsystems tend to "pre-fetch" many cache-lines of data. The term "pre-fetch" is known in the art and refers to the process of speculatively loading memory operands into a cache before the operands may be needed by a CPU or I/O subsystem. If a cache line required by an I/O stream of an I/O device is already in the cache (a cache hit), the I/O device will see a very small latency. However, if the cache line is not in the cache (a cache miss) the latency will be quite large. Note that an I/O device can have multiple active I/O streams, and pre-fetching is typically required for each stream.

Ideally, a cache associated with an I/O subsystem would be large enough so that the I/O subsystem could pre-fetch enough cache lines so that all I/O streams of all I/O devices would mostly encounter cache hits. Unfortunately, the number of cache lines required is the maximum number of I/O devices multiplied times the maximum number of I/O streams multiplied times the number of desired pre-fetches, and it is often not practical provide such a large cache.

Consider what would happen in a computer system that pre-fetches I/O data into a cache using the prior art LRU or FIFO replacement algorithms discussed above when a large number of open files are written to a disk write drive simultaneously. An I/O stream is associated with each file, and data required by each stream is pre-fetched into the cache. Further assume that the cache is filled before the I/O device is ready to accept any data. Both the LRU and FIFO algorithms will discard the contents of the cache lines that were loaded first, even though those cache lines are the ones which are most likely to be needed soon. In other words, using the LRU and FIFO algorithms, a later pre-fetch can cause replacement of cache lines just before an I/O device would have used these cache lines. Accordingly, the cache lines replaced were more important than at least some of the cache lines that were just pre-fetched. Of course, when this occurs the I/O subsystem generates a cache miss and the cache lines that are now needed must be reloaded.

The problem is made worse by the fact that I/O devices and subsystems often communicate by writing and reading from memory locations that are mapped to provide control functions. Once an operand is written to one of these memory locations, it is no longer needed. However, both the LRU and FIFO algorithms will retain the operand longer than necessary. What is needed in the art is a replacement algorithm for use with an I/O subsystem cache that does not replace cache lines just before the cache lines are about to be used, while allowing replacement of a cache lines as soon as the cache lines have been used and allowing replacement of cache lines that are not likely to be needed soon.

SUMMARY OF THE INVENTION

The present invention relates to a cache memory replacement algorithm that replaces cache lines based on the likelihood that cache lines will not be needed soon. A cache memory in accordance with the present invention is especially useful for buffering input/output (I/O) data as such data is transmitted between I/O devices and a main memory.

A cache memory in accordance with the present invention includes a plurality of cache lines that are accessed associatively. A count entry associated with each cache line stores a count value that defines a replacement class. The count entry is typically loaded with a count value when the cache line is accessed.

In accordance with the present invention, when speculative pre-fetches are performed to load the cache with main memory contents that are expected to be written to an I/O device, a replacement class is associated with each cache line by loading a count value into the count entry of each cache line and several status bits are updated. Replacement classes are assigned to cache lines based on the likelihood that the contents of cache lines will be needed soon. In other words, data which is likely to be needed soon is assigned a higher replacement class, while data that is more speculative and less likely to be needed soon is assigned a lower replacement class.

When the cache memory becomes full, the replacement algorithm selects for replacement those cache lines having the lowest replacement class. Accordingly, the cache lines selected for replacement contain the most speculative data in the cache that is least likely to be needed soon.

Using prior art cache replacement algorithms, cache lines tend to be replaced based on how long data had been in the cache, how long it has been since data was accessed, or at random. In a cache memory used to buffer I/O data, these prior art replacement algorithms tend to replace cache lines just before they are about to be used, while retaining cache lines that tend to be speculative and will not be needed soon. In the present invention, the cache lines most likely to be needed soon are least likely to be replaced, thereby maximizing the probability of a cache hit.

DETAILED DESCRIPTION OF THE PREFERRED EMBODIMENTS

Figure 1:
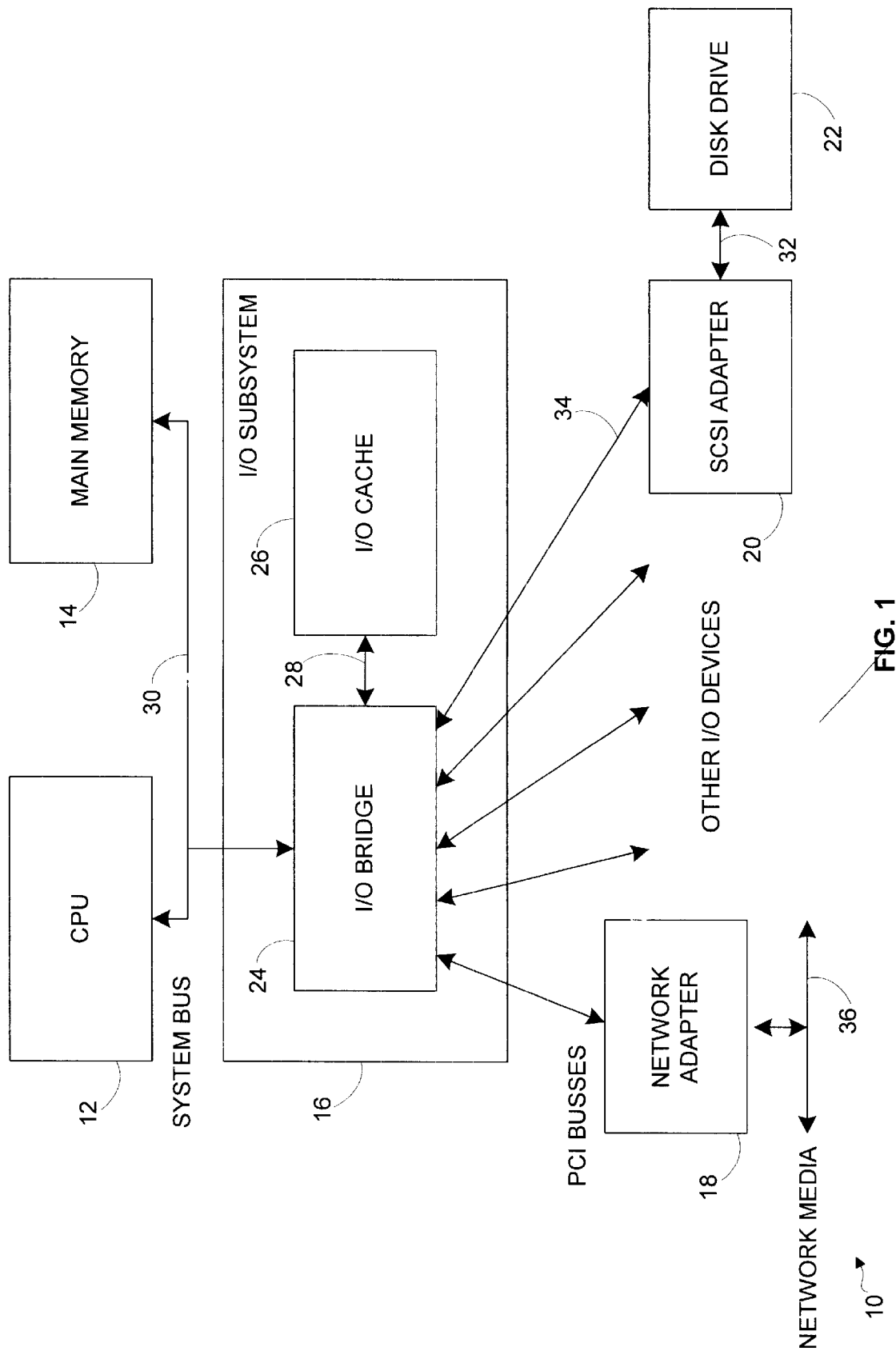
FIG. 1 is a simplified block diagram of a typical computer system, including an I/O cache in accordance with the present invention.

The present invention is a method and apparatus for replacing cache lines in a cache memory that is used to cache input/output (I/O) data. In accordance with the present invention, cache lines are replaced using a "not-needed-soon" (NNS) algorithm, which will be described in greater detail below. FIG. 1 is a simplified block diagram of a typical computer system 10, and will be used to illustrate the operation of the present invention. However, the present invention may be implemented in a variety of other computer system configurations. Computer system 10 includes a central processing unit (CPU) 12, a main memory 14, an I/O subsystem 16, and a plurality of network I/O devices represented by network adapter 18 and small computer system interface (SCSI) adapter 20. SCSI adapter 20 is coupled to disk drive 22 via SCSI bus 32, and network adapter 18 is coupled to network media 36. Note that in a typical computer system, other I/O devices will often be present. In addition, CPU 12 may include a plurality of CPUs, and one or more levels of cache memory, as is typical in the art.

System bus 30 couples together CPU 12, main memory 14, and I/O subsystem 16. For simplicity, system bus 30 is shown as a single bus, but those skilled in the art will recognize that system bus 30 could also be implemented using a multitude of bus segments coupled together by a "fabric of chips". I/O subsystem 16 includes an I/O bridge 24 and I/O cache 26, which are coupled together via I/O cache bus 28, Finally, I/O bridge 24 provides a plurality of peripheral component interconnect (PCI) busses, such as PCI bus 34, which couples I/O bridge 24 and SCSI adapter 20. Typically, the computer system will have a plurality of PCI slots, and the I/O devices will be implemented as PCI cards which are inserted into the PCI slots. Note that although the FIG. 1 shows a PCI bus, a variety of other bus architectures may be used, as is known in the art. In addition, a variety of intermediate busses may be used to couple I/O bridge 24 to the I/O devices.

Figure 2:
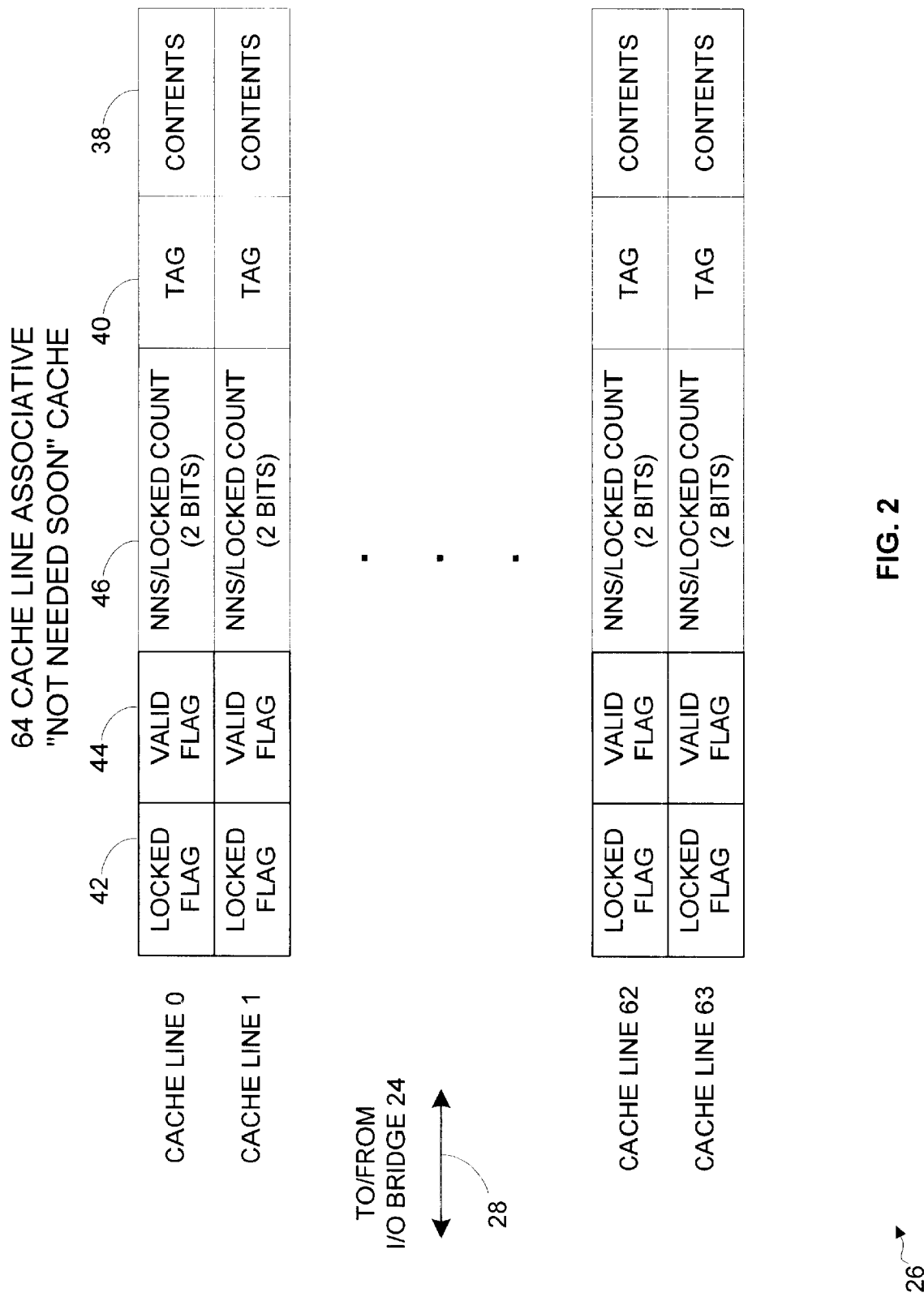
FIG. 2 is a diagram showing the organization of the I/O cache of FIG. 1.

FIG. 2 is a diagram showing the organization of I/O cache 26 of FIG. 1. Cache 26 is an associative cache having 64 cache lines. Note that although the following discussion refers to an associative cache, the concepts discussed herein may also be applied to the sets within a set-associative cache.

Each cache line has an entry that stores the cache line contents, such as contents entry 38 of cache line 0. In addition, each cache line includes a tag entry, such as tag entry 40 in cache line 0. The function of the tag entry is discussed above in the section entitled "Description of the Related Art".

In accordance with the present invention, cache lines are replaced using a "not-needed-soon" (NNS) algorithm. This algorithm defines two flags and one count entry that are associated with each cache line entry. The first flag is a locked flag, such as locked flag 42 of cache line 0. The second flag is the valid flag, such as valid flag 44 of cache line 0. Finally, the count entry is an NNS/locked count, such as NNS/locked count entry 46 of cache line 0. Note that entry 46 comprises two bits. However, as discussed below the entry can comprise any number of bits.

The valid flag simply indicates whether the cache line contains valid data. When the valid flag is clear ("0"), the cache line is empty and is eligible to receive a new cache line of data. When the valid flag is set ("1"), the cache line contains valid contents and is subject to replacement based on a hierarchy defined by the locked flag and the NNS/locked count entry. Since I/O cache 26 is used to buffer I/O data, cache lines are rarely read more than once. Accordingly, the valid flag is almost always cleared after the cache line is read from the cache. In the rare event that a cache line is needed more than once, the valid flag can be left set after a read operation. However, the cache line will still be eligible for replacement, as discussed below.

The locked flag is used to lock cache lines containing data that is known to be needed soon. For example, if an I/O device is sending data to CPU 12 via I/O subsystem 16, the data will be placed in a cache line of cache 26 with the locked and valid flags set, and thereafter the valid flag will be cleared when the data is read by CPU 12. Likewise, when data is written to an I/O device by CPU 12, the data known to be needed by the I/O device will be placed in a cache line cache 26 with the locked and valid flags set, and thereafter the valid flag will be cleared with the data is read by the I/O device. One of the features provided by the locked flags is helping to ensure forward progress by prohibiting the replacement of cache lines containing data that is known to be required.

The function provided the NNS/locked count depends on the status of the locked flag. When the valid and locked flags are set, the NNS/locked count serves a countdown timer that ensures that locked cache lines do not remain locked indefinitely. When the valid flag is set and the locked flag is clear, the NNS/locked count represents a replacement class that indicates the likelihood that the cache line will be needed soon. Typically, the valid flag is set and the locked flag is cleared when memory contents are speculatively pre-fetched into cache 26. In contrast, cache lines containing data that is known to be needed will have both valid and locked flags set.

When a cache line is loaded and the valid and locked flags are set, the NNS/locked count is set to a value of "11". As mentioned above, in this context the NNS/locked count is used to implement a slow countdown timer that ensures that the cache line does not remain locked indefinitely. A cache line may stay locked for several reasons. For example, a device driver or I/O device communicating with I/O subsystem 16 may encounter an error and stop responding, a CD-ROM may be ejected from a CD-ROM drive, a network connection may be disconnected from a network, etc.

The NNS/locked count of each cache line having valid and locked flags set is decremented at an appropriate interval. For example, if it is desired that valid and locked cache lines cache lines be released after eight seconds, then the NNS/locked count of each cache line having valid and locked flags set can be decremented once every two seconds. When the NNS/locked count reaches "00" (or alternately, wraps around to "11"), the cache line is available for replacement. In one configuration, the valid flag is cleared, thereby allowing the cache line to be loaded with a new value immediately. In another configuration, the valid flag is left set, and the NNS/locked counter is initialized to a value that indicates a replacement class, thereby indicating that the cache line is eligible to be replaced based on the replacement class, as will be described in greater detail below. Note that when the valid and locked flags of all cache lines are set (which should rarely occur), the NNS/locked counts of the cache lines may be decremented prematurely to free a cache line.

When a cache line's valid flag is set and its locked flag is clear, the cache line is eligible to be replaced based on a replacement class hierarchy defined by the NNS/locked count. One of the unique features of the present invention is that I/O bridge 24 (either acting alone or under control of CPU 12) may specify which cache lines are likely to be needed soon by specifying a NNS/locked count when cache lines are loaded into the cache. For example, if I/O bridge 24 is speculatively pre-fetching four cache lines, the cache line which will be needed first will have its NNS/locked count defined to indicated that it should be replaced last, while the cache line that is needed last may be replaced first. This will be described in greater detail below.

Valid cache lines having a cleared locked flag and a count of "00" are replaced first. If no cache lines are available having a count of "00", the NNS/locked counts of cache lines having their valid flag set and the locked flag cleared are decremented until one of the cache lines has a count of "00". Note that the decrement operation can be performed in parallel with the cache line replacement, since I/O bridge 24 can immediately identify the cache lines having the lowest count, use one of the identified cache lines as the new cache line, and decrement NNS/locked counts of all remaining cache lines having valid flags set and locked flags cleared.

In another configuration, when the valid flag is set and the locked flag is clear, non-zero NNS/locked counts can also be decremented using a slow countdown timer. Imagine that I/O bridge 24 places a cache line in cache 26 with the valid flag set, the locked flag clear, and the NNS/locked count set to "11". Further assume that the I/O device that was to read this cache line encounters an error, and stops responding. If cache 26 is not being heavily used, the NNS/locked counts of cache lines having their valid flag set and their locked flag clear may not be decremented because sufficient cache lines having their valid flag clear, or their valid flag set, locked flag clear, and an NNS/locked count of "00", are available. In this situation, speculatively pre-fetched cache lines having an NNS/count of "00" may replace other speculatively pre-fetched cache having an NNS/count of "00", while the cache line having an NNS/locked count of "11" will remain in the cache indefinitely. By also using a slow countdown timer to decrement the NNS/locked count of cache lines having their valid flag set, locked flag clear, and non-zero NNS/locked counts, the inactive cache line having an NNS/locked count of "11" will become eligible for replacement after a sufficiently long time.

As shown in FIG. 2, the NNS/locked count comprises two bits. Accordingly, four replacement classes are available. Assume that cache 26 is full and 10 cache lines have their valid flag set, their locked flag clear, and an NNS/locked count of "00". When an additional cache line is loaded into the cache, the cache line selected for replacement is randomly selected from the 10 cache lines having an NNS/locked of "00". Note that the random selection of a cache line results in some loss of precision. The precision may be increased by adding additional bits to the NNS/locked count. Alternatively, the NNS/locked count can comprise a single bit, which would be less precise. An implementor of the present invention will need to balance the tradeoff between the precision provided the number of NNS/locked bits, and the complexity and circuitry required to implement sufficient bits. The inventors of the present invention believe that a count having two bits provides acceptable precision while requiring minimal circuitry and complexity.

The cache replacement algorithm described above is summarized below in Table 1. Note that the order of the table also represents the cache line replacement hierarchy. An entry of "X" indicates a "don't care" condition. In the usage column, "empty" indicates the cache line is not being used and is available to receive a cache line, "locked" indicates the cache line is locked and is not eligible for replacement, and "NNS" indicates that the cache line is available for replacement based on the NNS/locked count if there are no empty cache lines.

TABLE 1

| Usage | Valid Flag | Locked Flag | NNS/ Locked Count | Comments |
|---|---|---|---|---|
| Empty | 0 | X | XX | Cache line is available for use. |
| NNS | 1 | 0 | 00 | Cache lines in this replacement class least likely to be needed soon, and may be replaced if no empty cache lines are available. |
| NNS | 1 | 0 | 01–11 | Progressively more likely to be needed soon than cache lines having valid flags set, locked flags cleared, and lower NNS/locked counts. NNS/locked counts will be decremented if a cache line needs to be loaded and there are no empty cache lines and no cache lines having their valid flag set, locked flag cleared, and an NNS/locked count of "00". May also be decremented using a slow countdown interval to allow cache lines that have been in the cache too long to reach an NNS/locked count of "00", thereby allowing the cache line to become eligible for replacement. |
| Locked | 1 | 1 | 00–11 | Cache line is locked and cannot be replaced. NNS/locked count will countdown from "11" to "00" at a relatively long interval to implement a timeout. Countdown may be accelerated if all cache lines are locked. When count reaches "00" (or alternatively, wraps around to "11"), cache line is marked empty. Alternatively, cache line can be set to NNS by leaving valid flag set, clearing locked flag and setting |

TABLE 1-continued

| Usage | Valid Flag | Locked Flag | NNS/ Locked Count | Comments |
|---|---|---|---|---|
| | | | | NNS/locked count to indicate replacement class, as described above. |

There are several ways that the not-needed-soon (NNS) replacement algorithm described above may be exploited. Assume that the present invention is to be used in a computer system having "generic" drivers, such as a computer system running an off-the-shelf operating such as the Windows NT® operating system provided by Microsoft Corporation. In such a computer system, the drivers will not have any knowledge about the organization of I/O cache 26. In such a configuration, speculative pre-fetches are generated by I/O bridge 24 of I/O subsystem 16.

When the computer system is initialized (such as after being powered on), I/O bridge 24 scans all I/O devices. This can be done using a special driver for I/O subsystem 16, or as part of a BIOS initialization routine. As the I/O devices are scanned, the memory location ranges through which the I/O devices communicate are identified and classified based on the speed of the I/O device. The initialization routine will assign a "speculative pre-fetch depth" to each I/O device. For example, fast I/O devices, such as disk drives or network adapters, may be assigned a pre-fetch depth of eight cache lines. Alternatively, slow I/O devices, such as floppy drives or modems, may be assigned a smaller pre-fetch depth or no pre-fetch depth at all.

To understand how I/O bridge 24 speculatively pre-fetches cache lines, consider that CPU 12 seeks to write a file to disk drive 22. Further assume that each cache line of cache 26 holds eight bytes, the file is stored in main memory 14 starting at address A, and the pre-fetch depth for disk drive 22 is set to eight cache lines. First, a driver routine executed by CPU 12 will issue a SCSI disk write command to I/O bridge 24 to write address A to disk 22. I/O bridge 24 will write the command to SCSI adapter 20, and thereafter SCSI adapter 20 will attempt to perform a direct memory access (DMA) operation to load address A into an address location that is mapped to SCSI adapter 20. The DMA operation will produce a cache miss, since address A is not in I/O cache 26. I/O bridge 24 recognizes that the destination of the DMA operation is an address range used by SCSI adapter 20 and disk drive 22, and the pre-fetch depth for this I/O combination has been initialized to eight. Accordingly, I/O bridge 24 will fetch the memory contents required by SCSI adapter 20 (as well as pre-fetch additional memory contents) from main memory 14, and store the memory contents in I/O cache 26 as follows:

| Pseudo Instruction | Valid Flag | Locked Flag | NNS/Locked Count |
|---|---|---|---|
| Fetch A | 1 | 1 | 11 |
| Pre-fetch A + 8 | 1 | 0 | 11 |
| Pre-fetch A + 16 | 1 | 0 | 11 |
| Pre-fetch A + 24 | 1 | 0 | 10 |
| Pre-fetch A + 32 | 1 | 0 | 10 |
| Pre-fetch A + 40 | 1 | 0 | 01 |
| Pre-fetch A + 48 | 1 | 0 | 01 |
| Pre-fetch A + 56 | 1 | 0 | 00 |

Note that the fetch of address A is locked because it is not speculative and it is known that SCSI adapter 20 will read the contents of address A from I/O cache 26 as soon as the contents are loaded into a cache line. However, the other pre-fetches are speculative, since it is not known whether (but highly probably that) SCSI adapter 20 will soon require the contents of the pre-fetched addresses. Note that the NNS/locked counts have been set to distribute the speculative pre-fetches among the available replacement classes, with the pre-fetches that are most likely to be needed soon having higher counts and the pre-fetches that are farther out in time (and therefore more speculative) having lower counts. When the driver routine executed by CPU 12 issues the next SCSI disk write command to I/O bridge 24 to write address A+8 to disk drive 22, the DMA operation will produce a cache hit in I/O cache 26, thereby hiding the latency of main memory 14.

In one configuration, DMA operations initiated by SCSI adapter 20 will continue to produce cache hits until all eight cache lines have been read (assuming none have been replaced). At this point, the next DMA operation will produce a cache miss, eight more cache lines will be fetched, and the process will continue.

In another configuration, pre-fetched cache lines are "refreshed" and speculative pre-fetches are issued as DMA operations occur. In this configuration, as each DMA operation occurs, a speculative pre-fetch is executed by I/O bridge 24 and the NNS/locked count of the speculative pre-fetches that have already been loaded are adjusted to reflect the likelihood that the pre-fetch will be needed soon. Accordingly, in this configuration, I/O bridge 24 attempts to maintain the cache line pre-fetch depth within cache 26.

Now consider that I/O subsystem 16 becomes busy, and I/O cache 26 becomes full. All of the cache lines contain valid data, so a cache line must be selected for replacement. According to the replacement algorithm described above, cache lines having their valid flag set, their locked flag clear, and an NNS/lock count of "00" are eligible to be replaced. As discussed above, these cache lines contain data that was speculatively pre-fetched, and is least likely to be needed soon. Therefore, replacing these cache lines will minimize (or at least defer) the chance of a cache miss. In addition, if the cache lines are being refreshed as DMA operations occur, the replaced cache line contents may be pre-fetched again before the I/O device attempts to read the memory contents. In contrast, consider a prior art cache having either a first-in first-out (FIFO) or least recently used (LRU) replacement strategy. In such a cache, the cache lines replaced will typically be the cache lines that were loaded first, which also happen to be the cache lines most likely to be needed soon. Accordingly, prior art cache replacement algorithms are much more likely to produce cache misses.

Typically, the pre-fetch depth for each I/O device will be initialized when the computer system is initialized. The pre-fetch depth may be hard-coded into the I/O subsystem driver or BIOS, or may be selected by one who is configuring computer system 10. Alternatively, the pre-fetch depth may dynamically adapt based on cache activity. If a large percentage of pre-fetched cache lines are being replaced before being used, the pre-fetch depth can be reduced. Likewise, the pre-fetch depth may be increased if a small percentage of pre-fetched cache lines are being replaced.

Note that when data is read from an I/O device into I/O cache 26, the valid and locked flags will be set and the NNS/locked count is set to "11". This data is not speculative and it is known that CPU 12 requires this data since CPU 12 issued the read command.

In the above discussion, it was assumed that the device driver being executed by CPU 12 had no knowledge of the cache replacement and pre-fetch strategies used by I/O subsystem 16. However, it is within the scope of the present invention to use a device driver that is optimized to work with I/O subsystem 16. Such a device driver could inform I/O subsystem 16 of the address range that will be moved from main memory 14 to an I/O device. Therefore, all pre-fetches will be for memory contents that will actually be sent to an I/O device. In contrast, if the device driver has no knowledge of the cache replacement and pre-fetch strategies used by I/O subsystem 16, when the last data is written to the I/O device, there will typically be cache lines in I/O cache 26 that were pre-fetched, but not needed. Also, a device driver is in a better position to assign replacement classes to speculative pre-fetches, as well as set the pre-fetch depth for devices that it services. Accordingly, exposing the cache replacement and pre-fetch strategies of I/O subsystem 16 to device drivers executed on CPU 12 can further increase the benefits achieved by the present invention.

The present invention provides a cache replacement algorithm that allows cache lines containing speculatively fetched data to be replaced based on the likelihood that those cache lines will not be needed soon, while avoiding replacement of cache lines containing data known to be needed. Conceptually, the present invention is similar to providing each I/O stream having a defined speculative pre-fetch depth with its own FIFO buffer, with memory contents that are more likely to be needed soon at the top of the FIFO buffer and memory contents that are less likely to be needed soon at the bottom of the FIFO buffer. However, if the cache is full, memory contents are removed from the bottom of the FIFO buffers, thereby allowing the memory contents that are more likely to be needed soon to remain in the buffer.

While the present invention provides a superior method of replacing cache lines in a cache used to buffer I/O data compared to prior art replacement algorithms, the circuitry required to implement the present invention is relatively simple. All that is required are two flags for each cache line, along with a loadable, decrementable count entry. In addition, only a small number of bits are needed for the count entry. As described above, the present invention provides acceptable results with a count entry having only two bits. Of course, one implementing the present invention may chose to use more bits or a single bit to define the count entry, as discussed above.

The present invention was described above with reference to a cache that is used in an I/O subsystem. However, the concepts disclosed herein may also be used with any cache which is used to store memory contents that are fetched speculatively. For example, consider a cache having a combined LRU/NNS replacement algorithm, in accordance with the present invention. A flag associated with each cache line would indicate whether that cache line is governed by the LRU replacement algorithm or the NNS algorithm. When a cache line is speculatively fetched, the flag can be set to indicate the NNS algorithm should be used, and the count entry can be loaded with a value indicative of a replacement class. When a cache line is used non- speculatively, the flag can be cleared to indicate that the LRU algorithm should be used, and the count entry can be initialized to indicate that the cache line was most recently used. When a cache line needs to be replaced, the replacement algorithm can choose from cache lines that are eligible to be replaced as indicated by the LRU and NNS algorithms. The replacement algorithm could simply alternate between the NNS and LRU algorithms, or select an algorithm based on the ratio of cache lines currently in use by each algorithm. If no cache lines using the NNS algorithm are available for replacement, the count value of those lines can be decremented as described above. The count values of those cache lines using the LRU algorithm would be updated in accordance with the LRU algorithm. Though the implementation of such a cache would somewhat more complex than prior art caches, those skilled in the art would recognize how to adapt the teachings herein to design such a cache.

Although the present invention has been described with reference to preferred embodiments, workers skilled in the art will recognize that changes may be made in form and detail without departing from the spirit and scope of the invention.

What is claimed is:

1. A method for replacing a cache memory load comprising:

assigning a replacement class to a first cache memory load, wherein said replacement class is based on a likelihood that said first cache memory load will be needed soon;

storing said replacement class assigned to said first cache memory load in a replacement class entry associated with said first cache memory load; and if said first cache memory load is eligible to be replaced, using said replacement class to determine whether said first cache memory load should be replaced prior to replacement of a second cache memory load.

2. The method for replacing a cache memory load as recited in claim 1 wherein said replacement class is based on a degree to which said first cache memory load is speculative.

3. The method for replacing a cache memory load as recited in claim 1, wherein said replacement class is selected from a range of replacement classes extending from a lowest replacement class to a highest replacement class.

4. The method for replacing a cache memory load as recited in claim 3 wherein if said replacement class of said first cache memory load is closer to said lowest replacement class than is a replacement class of said second cache memory load, replacing said first cache memory load prior to replacing said second cache memory load.

5. The method for replacing a cache memory load as recited in claim 4 further comprising:

if said replacement class of said first cache memory load and said replacement class of second cache memory load are not said lowest replacement class, decrementing said replacement class of said first cache memory load and said replacement class of said second cache memory load until either said replacement class of said first cache memory load or said replacement class of said second cache memory load is at said lowest replacement class.

6. The method for replacing a cache memory load as recited in claim 1 further comprising:

if it is desired to prevent replacement of said first cache memory load, setting a locked flag indicating that said first cache memory load is not eligible for replacement.

7. A cache memory line for enabling assignment of a replacement class, said cache memory line comprising:

a replacement class entry, said replacement class entry for storing a replacement class corresponding to a first cache memory load, said replacement class used to determine whether said first cache memory load should be replaced prior to replacement of a second cache memory load, said replacement class based on a likelihood that said first cache memory load will be needed soon; and a contents entry coupled to said replacement class entry, said contents entry for storing said first cache memory load.

8. The cache memory line of claim 7 for enabling assignment of a replacement class further comprising:

a valid flag entry coupled to said replacement class entry, contents of said valid flag entry for indicating whether said contents entry has a valid data stored therein.

9. The cache memory line of claim 7 enabling assignment of a replacement class further comprising:

a locked flag entry coupled to said replacement class entry, contents of said locked flag entry indicating whether said first cache memory load is eligible for replacement.

10. The cache memory line of claim 7 for enabling assignment of a replacement class wherein said replacement class is selected from a range of replacement classes extending from a lowest replacement class to a highest replacement class.

* * * * *